(12) United States Patent
Cina et al.

(10) Patent No.: US 6,341,444 B1
(45) Date of Patent: Jan. 29, 2002

(54) INSECT GUARD SYSTEM

(75) Inventors: Yaron Cina; Ohad Tadmor, both of Jordan Valley (IL)

(73) Assignee: Ultramesh Environmental Technologies Ltd., Jordan Valley (IL)

( * ) Notice: Subject to any disclaimer, the term of this patent is extended or adjusted under 35 U.S.C. 154(b) by 0 days.

(21) Appl. No.: 09/426,898

(22) Filed: Oct. 26, 1999

(51) Int. Cl.$^7$ .................. A01M 19/00; A01M 1/24; A01M 1/22
(52) U.S. Cl. .............................. 43/98; 43/119
(58) Field of Search ............................ 43/98, 107, 112, 43/119; 174/70 A, 140 R, 140 C, 147, 117 M; 439/90, 86; A01M 1/22, 1/24

(56) References Cited

U.S. PATENT DOCUMENTS

| | | | | | |
|---|---|---|---|---|---|
| 1,059,253 A | * | 4/1913 | Wimbish | ...................... | 43/112 |
| 1,651,999 A | * | 12/1927 | Coglon | ...................... | 43/112 |
| 1,879,495 A | * | 9/1932 | Renwick | ...................... | 43/112 |
| 2,278,538 A | * | 4/1942 | Dubilier | ...................... | 43/112 |
| 4,300,306 A | * | 11/1981 | Hudgin | ...................... | 43/112 |
| 4,463,323 A | * | 7/1984 | Piper | ...................... | 333/1 |
| 4,728,080 A | * | 3/1988 | Kurschner et al. | ............ | 256/10 |
| 4,956,524 A | * | 9/1990 | Karkow | ................. | 174/117 M |
| 5,036,166 A | * | 7/1991 | Monopoli | ................. | 174/128.1 |
| 5,380,954 A | * | 1/1995 | Orr, Jr. | ................... | 174/117 M |

FOREIGN PATENT DOCUMENTS

| | | | | | |
|---|---|---|---|---|---|
| GB | 2118815 | * | 11/1983 | ............ | A01M/1/22 |
| JP | 10238257 | * | 9/1998 | ............ | E06B/9/52 |
| JP | 10266736 | * | 10/1998 | ............ | E06B/9/52 |
| WO | 79/00574 | * | 8/1979 | ............ | A01M/1/22 |
| WO | 99/44418 | * | 9/1999 | ............ | A01M/1/22 |

* cited by examiner

Primary Examiner—Peter M. Poon
Assistant Examiner—Son T. Nguyen
(74) Attorney, Agent, or Firm—Mark M. Friedman

(57) ABSTRACT

A system for repelling all types of insects, including flying insects and tiny insects, including a screen with openings having two conducting elements separated by an insulating medium, and a power source connected to the conducting elements, wherein the two conducting elements produce a low-voltage differential across openings in the screen, such that insects attempting to penetrate the openings are subjected to non-lethal electrical shock caused by a bridging of the low-voltage differential.

19 Claims, 4 Drawing Sheets

INSECT GUARD SYSTEM

FIELD AND BACKGROUND OF THE INVENTION

The present invention relates to the prevention of infestation or contamination of buildings by insects, and, more particularly, to an apparatus which deters insects from intruding through household-type screens and to an apparatus which deters insects from penetrating greenhouses, food storage facilities, and the like, and to an apparatus which deters termites from infesting and damaging wood structures.

The intrusion of insects into buildings, food products, etc., poses many problems. Insects such as termites and cockroaches are potentially destructive and disease-carrying; moths, flies, bees and mosquitoes bring with them various characteristic problems.

In an effort to meet the challenges posed by the insects, various methods of preventing or reducing insect infestation have been developed. Of the techniques used for prevention and elimination, insecticides are probably the most effective, but require periodic and possibly frequent reapplication to maintain effectiveness. In addition, insecticides are often toxic not only to the target insects, but also to non-targeted insects, plants, animals, and human beings. The use of insecticides is often ineffective when the breeding area of the pests is unknown or inaccessible.

Various attempts have been made to deal with insect intrusion in a non-toxic fashion, including fourth-generation insecticides, which are highly specific to a particular pest. The proper application of such chemicals is characteristically difficult, and a different insecticide is required for each kind of pest. As with less sophisticated chemicals, the application is generally ineffective when the breeding area of the pests is unknown or inaccessible. Moreover, the use of insecticides is in some cases prohibited by law to prevent contamination of underground waters.

Electrical and mechanical devices for the elimination of insects are an alternative or a supplement to chemical sprays, coatings, and traps. Such devices typically lure the insects and subsequently trap and/or kill them. These devices fall far short of providing comprehensive protection against infestation. Not only do they allow the insects free entry into the building, in some cases they exacerbate the problem by attracting more insects.

Many prior art devices employ high voltage systems to electrocute and burn the insect, and require special means of protection. Such devices cause unpleasant odors and are likely to leave an unsightly residue, which is particularly disadvantageous when applied to a screen.

The idea of repelling insects with low voltage is also taught by prior art. U.S. Pat. No. 4,827,874 to Mahan discloses applying a low voltage to conductive strips secured to the side wall of a pet feeding dish to discourage movement up the dish. This device does not, however, provide a fundamental solution for airborne insects, neither does it prevent the insects from entering a building.

In Saunders et al., U.S. Pat. No. 5,007,196, insects are discouraged from getting into a site by applying a low voltage current to a screen at the base of a vertical structure. The insect completes the circuit, and the voltage is such that the insect is repelled but not electrocuted. This invention provides a solution for crawling insects, but not for airborne or jumping pests.

Standard household-type screens, commonly known as 16×18 mesh screens, provide protection against crawling, jumping, and flying insects. However, such screens are ineffective in preventing the penetration of insects that can penetrate the screen, such as small mosquitoes. Moreover, household screens wear and tear with time, such that even larger insects simply move along the screen until the enlarged opening is discovered. The entire screen is rendered ineffective, requiring the installation of a new unit.

Screens are also used in agricultural applications as a means of protecting crops from intruding insects and from the various associated damages resulting therefrom. Greenhouses are typically fitted with screen in which the openings are ~0.30 mm (50 mesh, ASTM). Screens with larger openings provide ineffective protection. Screens with openings of 0.30 mm provide some protection, but many kinds of insects are small enough to penetrate the openings with facility. For example, *Thrips tabaci* is an insect that causes significant damage to crops in most areas of the world. Adult *Thrips tabaci* have a body width of only 0.03–0.05 mm, and have no trouble passing through standard agricultural screens with 0.30 mm openings.

Screens with smaller openings are considerably more expensive. Moreover, the increased screen density negatively impacts the climactic conditions in the protected area, such that both sunlight and ventilation are substantially reduced.

Some growers spray their larger-mesh screens with insecticides to overcome these problems, but without great success.

There is thus a widely recognized need for, and it would be highly advantageous to have, a non-toxic, user-friendly prophylactic device providing inexpensive, comprehensive protection from all types of insects, including flying insects and including tiny insects that normally penetrate household and agricultural screens.

SUMMARY OF THE INVENTION

It is therefore an object of the present invention to provide an insect-repelling device and method that prevent all kinds of insects—crawling, jumping, and flying—from entering a protected structure.

It is another object of the present invention to provide a protective device that is effective in repelling tiny insects, which normally penetrate ordinary household and agricultural screens.

It is another object of the present invention to provide a method of protection that is non-lethal to the insects such that the deposition of unsightly insect residue is avoided.

It is another object of the present invention to provide an effective protective device that is non-toxic and is harmless to human beings and animals when touched.

Another object of the present invention is to provide such effective protection against intruding insects in an inexpensive fashion, using a system that is simple to operate and can work continuously.

It is another object of the present invention to provide an effective protective device that is effective in repelling tiny insects that normally penetrate ordinary household and agricultural screens, while maintaining and not reducing the amount of sunlight and ventilation.

It is yet another object of the present invention to retrofit standard household screens, such that the function of such screens is substantially augmented without the implementation of an additional system.

Yet another object of the present invention is to provide a device that increases the longevity of standard household-type screens.

According to the present invention there is provided a system for preventing the intrusion of insects and providing a substantially insect-free zone, which comprises a screen, wherein each screen opening is bounded by two conducting elements separated by an insulating medium, and a source of electrical current connected to two conducting elements such that a low-voltage differential is established across boundaries of the opening. When an insect body bridges between conducting elements of opposite charge, the low-voltage differential induces a nervous and muscular reaction in the insect, such that the insect is repelled.

As used herein in the specification and claims section below, the word "screen" refers to a framework with multiple holes, spaces, or perforations, designed to allow the passage of air and/or light and or particles through said holes, spaces, or perforations. The screen as described herein is typically, but not limited to, a network made up of wires or threads running in more than one direction to form a mesh configuration, a framework of parallel or crisscrossed bars, or a plate with multiple perforations.

According to further features in preferred embodiments of the invention described below, the screen is constructed such that the entire screen grid can be activated by connecting a small power source to two conducting, insulated wires on the grid.

In a preferred embodiment, the device is manufactured in a layered, sandwich-type configuration, with conducting material in the top and bottom layers and an insulating material in between. Slits are made in the material, according to standard industrial practice, such that expanded, conducting lath is obtained upon stretching. The top and bottom layers of the device are connected to a low-voltage, low-current power source. The entire perimeter of the openings is electrically-activated, such that a voltage-differential is produced, and insects attempting to penetrate are shocked and repelled.

In another preferred embodiment, the device is layered in a sandwich-type configuration, as described above. Perforations or openings of various geometries (e.g. square, circular, rectangular) are made through the layers according to standard manufacturing practices. The top and bottom layers of the device are connected to a low-current power source. The thickness of the insulating layer is such that an insect attempting to penetrate through an opening must necessarily bridge the gap between positively-charged and negatively-charged layers. The current passing through the body of the insect shocks and repels the insect, thereby inhibiting penetration.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides an insect-repelling device and method that prevent all kinds of insects—crawling, jumping, and flying—from entering a protected structure. The device is effective in repelling tiny insects, which normally penetrate ordinary household and agricultural screens.

The present invention can also be applied to prevent living creatures of other kinds from penetrating a screen and entering a protected structure.

Screens according to the present invention can be designed according to need and can be produced with facility using existing manufacturing processes, including:

Weaving transverse threads with a loom;

Knitting with one or more continuous threads, the screen framework being formed by loops that are spaced along the thread at defined intervals;

Adhesion: A layer of threads in one direction is placed on top of a layer of threads oriented in the transverse direction. The screen framework is produced by bonding the layers at the points of contact;

Perforation:
(a) Punching holes in a sandwich-type framework that comprises two conducting layers separated by an insulating layer; or
(b) Producing slits in a sheet with a press to obtain expanded lath;

Extrusion: Production of an extruded sheet with a sandwich-type framework which is subsequently conveyed between spiked rollers to produce a screen;

Slitting: Layers are slit at fixed intervals. One layer is placed on top of another layer with the slits running in the transverse direction to produce the form of a screen.

The principles and operation of an insect-repelling screen according to the present invention may be better understood with reference to the drawings and the accompanying description.

Figure 1:
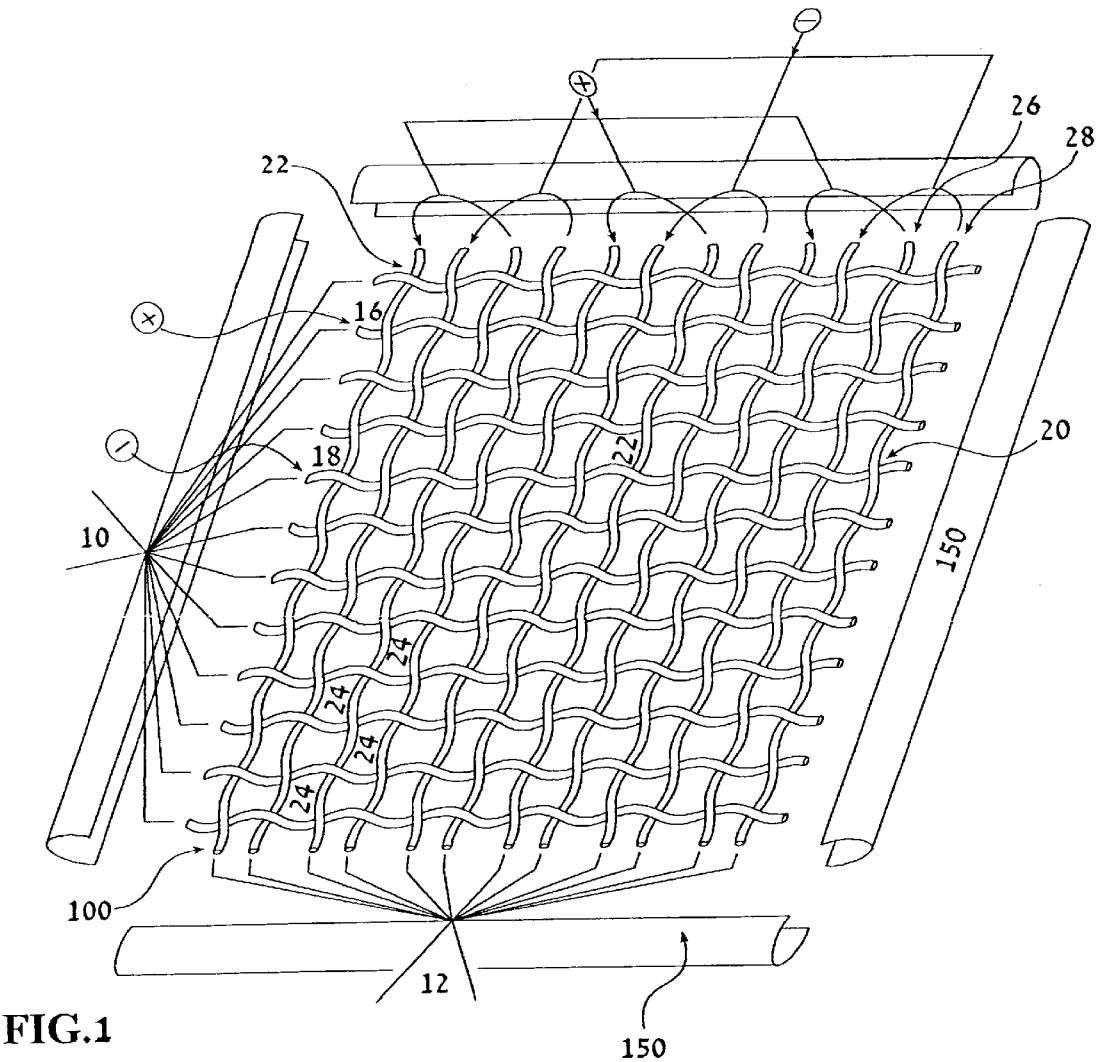
FIG. 1 is a schematic drawing of a screen according to a presently preferred embodiment.

Referring now to the drawings, FIG. 1 illustrates the screen 100 according to the invention. Insulating strips 150 along the perimeter of the screen contain the screen and prevent short-circuiting. The construction of the screen is such that all the wires 10 running in one direction are insulated, and all the wires 12 in the transverse direction are bare (uninsulated). Current is propagated to the screen from the power source via two conducting, insulated wires, one wire 16 carrying a positive charge, the other wire 18, a negative charge. Insulated wires 10 have a bare spot 20 at alternate contact-points between insulated and bare wires. The bare spots 20 allow current to be conducted from the power source through wire 16 to positively-charged, bare wires 26 running in the transverse direction, and through wire 18 to negatively-charged, bare wires 28 running in the transverse direction.

As contact with wires running in the transverse direction and having the opposite charge would cause a short-circuit, the insulation is left intact at such points 22.

Like the two insulated wires described above 16, 18 the rest of the insulated wires 10 have a bare spot 20 at alternate contact-points between insulated 10 and bare 12 wires. Current from the bare wires 12 is conducted via such contact points 24 to all the transverse, insulated wires 10 having a like charge. Thus, although only two wires on the grid are connected to a power source, all bare wires in the grid become electrically-activated, such that a low-voltage current suitable for repelling insects can be established across the boundaries of the screen openings.

In the present invention, the system for repelling insects detects a bridge in polarity at a current maintained at 1–60 milliamperes and discharges the current, such that insects are shocked and repelled. Such a current is not, however, strong enough to harm humans and animals. More preferably, the current is maintained at 2–15 milliamperes. Preferably, the present invention uses a low-voltage power source, i.e., a voltage that does not exceed 200 Volts, and more preferably, a voltage that does not exceed 12 Volts D.C. A standard household battery is suitable for most applications.

Figure 2:
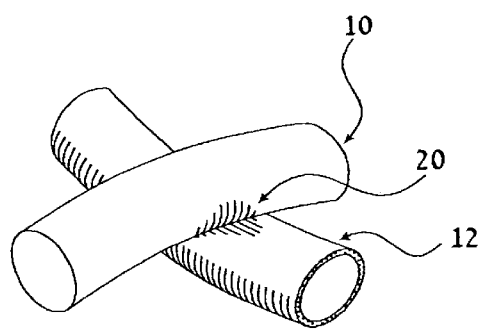
FIG. 2 is a schematic drawing of the contact between a non-insulated wire and an insulated wire having an uninsulated spot.

FIG. 2 illustrates the contact between a non-insulated wire 10 and an insulated wire 12 of like charge. Contact between the non-insulated wire and the insulated wire is effected by melting the insulating material at the contact point 20, such that the wires are fused together. Alternatively, the insulated wire can have a bare spot at the contact point.

Figure 3:
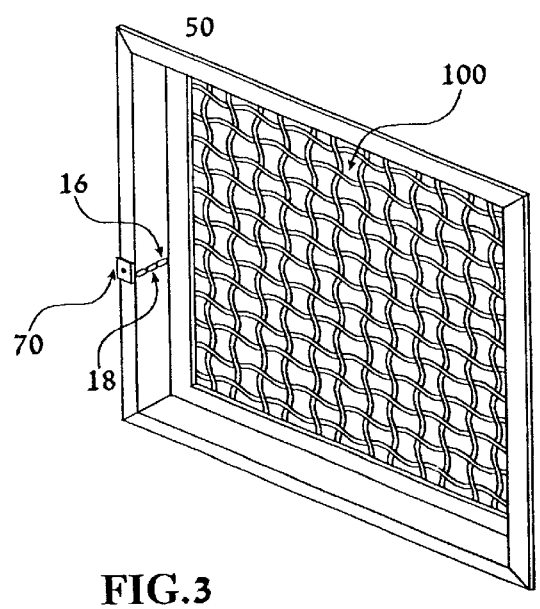
FIG. 3 is a schematic drawing of a presently preferred embodiment of the invention, installed in a window frame.

FIG. 3 illustrates a preferred embodiment of the invention, installed in a conventional window frame 50. Insulated wires 16, 18 connect the power source 70 to the screen 100.

A window opening with no screen or with an ordinary household screen can be retrofitted with a screen according to the present invention, such that a weak current suitable for repelling insects can be established across the boundaries of the screen openings.

The invention increases the longevity of standard household screens. Household screens wear and tear with time, such that even relatively large insects simply travel along the screen until the enlarged opening is discovered. The entire screen is rendered ineffective, requiring the installation of a new unit. This mode of "search and enter" is denied by the invention, as touching down on the grid results in an electrical shock that repels the insect from the screen.

The arrangement described above applies to screens with conducting wires. In another preferred embodiment, non-conducting threads, such as fiberglass or plastic, are utilized. In such a configuration, threads running in one direction are coated with a conducting material; threads running in the transverse direction are first coated with a conducting material followed by a non-conducting overlayer. At alternate contact-points between insulated and bare wires, the insulated wires have a bare contact spot. The bare spot allows current to be transferred from one wire to the other wire having the same electrical charge and running in the transverse direction.

In the above-described embodiments, the low-voltage differential for repelling insects is established when the body of the insect bridges the electrically-activated, bare wires. The body of the insect includes six legs and two antennae, all of which contain a certain degree of moisture and are sensitive to electrical current. As observed by the inventors, the insects map the opening by scanning the walls of the opening with the antennae, mouth and legs. Thus, even an insect that is small relative to the dimensions of the opening is subjected to electrical shock and is repelled during the mapping process.

Since only contact between the insect and the bare wires in the above-described embodiments results in electrical shock; there is no significant electrical effect when the insect contacts insulated wires. Hence, the electrically-active contact area on the grids described in the above embodiments is only 50% of the total contact area.

Figure 4:
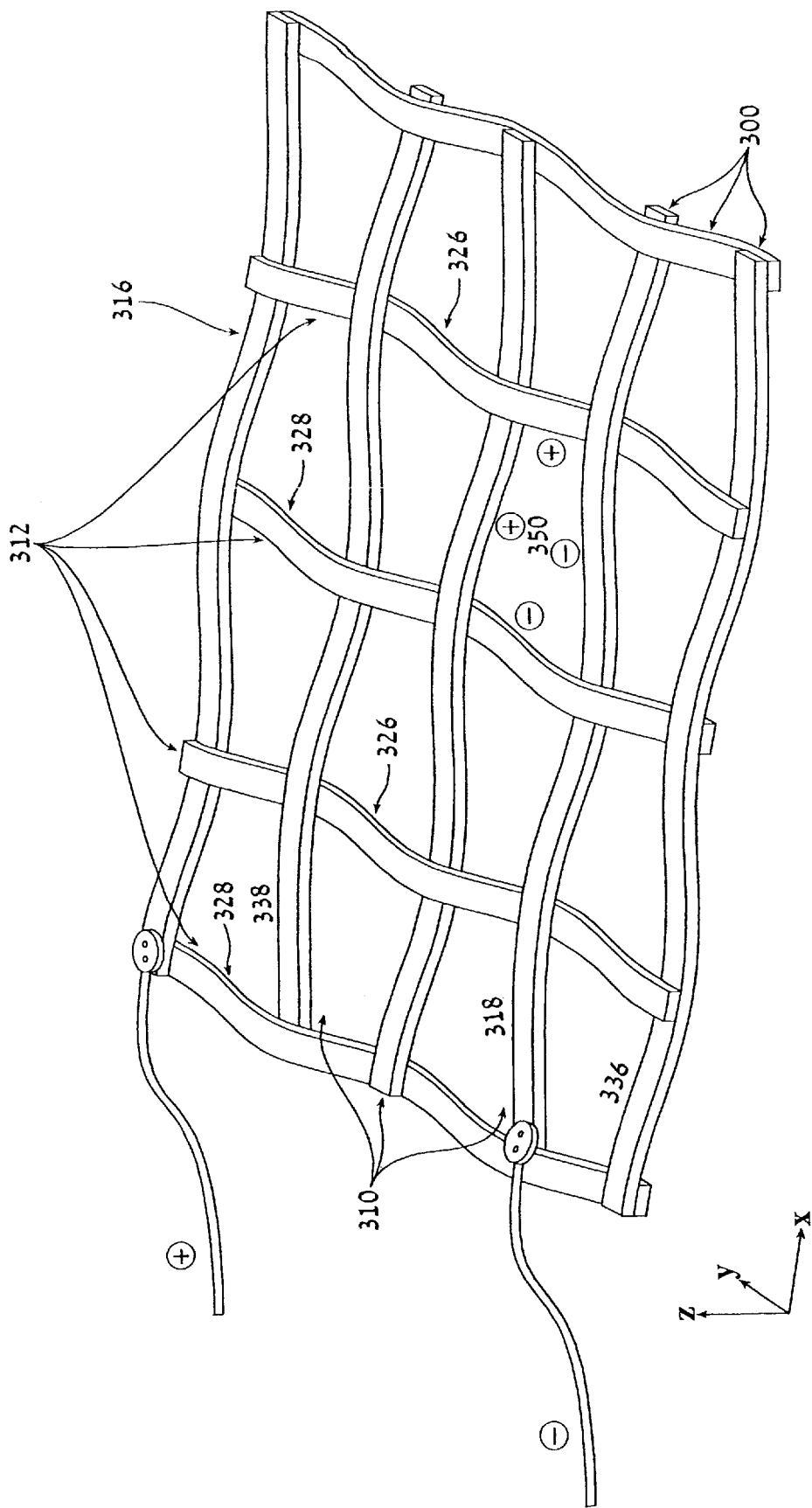
FIG. 4 is a schematic drawing of a presently preferred embodiment of the invention in which the grid is formed from insulated and non-insulated rectangular conducting strips.

In another preferred embodiment, illustrated by way of example in FIG. 4, the electrically-active contact area on the grid approaches 100% of the total contact area. The strips making up the grid 300 are rectangular. The construction of the grid is such that all the strips 310 running in the X-direction have a conducting layer on the top side (Z-direction) and a non-conducting layer on the bottom side, and all the transverse strips 312 running in the Y-direction are non-insulated. Current is propagated to the screen from the power source via two strips, running in the X-direction, one strip 316 carrying a positive charge, the other strip 318, a negative charge. As a result of the woven configuration, the positively-charged strip 316 transfers current to alternate non-insulated strips 326 in the transverse direction, and the negatively-charged strip 318 transfers current to alternate non-insulated strips 328 in the transverse direction. Positively-charged strips 326 transfer current to the layered strips 336 running in the X-direction and not connected to the power source, and negatively-charged strips 328 transfer current to the layered strips 338 running in the X-direction and not connected to the power source. Thus, although only two strips are connected to a power source, all strips in the grid become electrically-activated, such that a low-voltage current suitable for repelling insects can be established across the boundaries of the screen.

In the configuration of the preferred embodiment described above, all the openings on the grid are bounded by 100% electrically-active contact area. Opening 350, by way of example, is bounded by two adjacent positively-charged strips and by two adjacent negatively-charged strips. A grid with this configuration provides superior resistance to the penetration of insects relative to configurations in which the electrically-active contact area is only 50%.

The strips described above are most preferably flat on top and on bottom, with the strip width exceeding the strip thickness.

Figure 5:
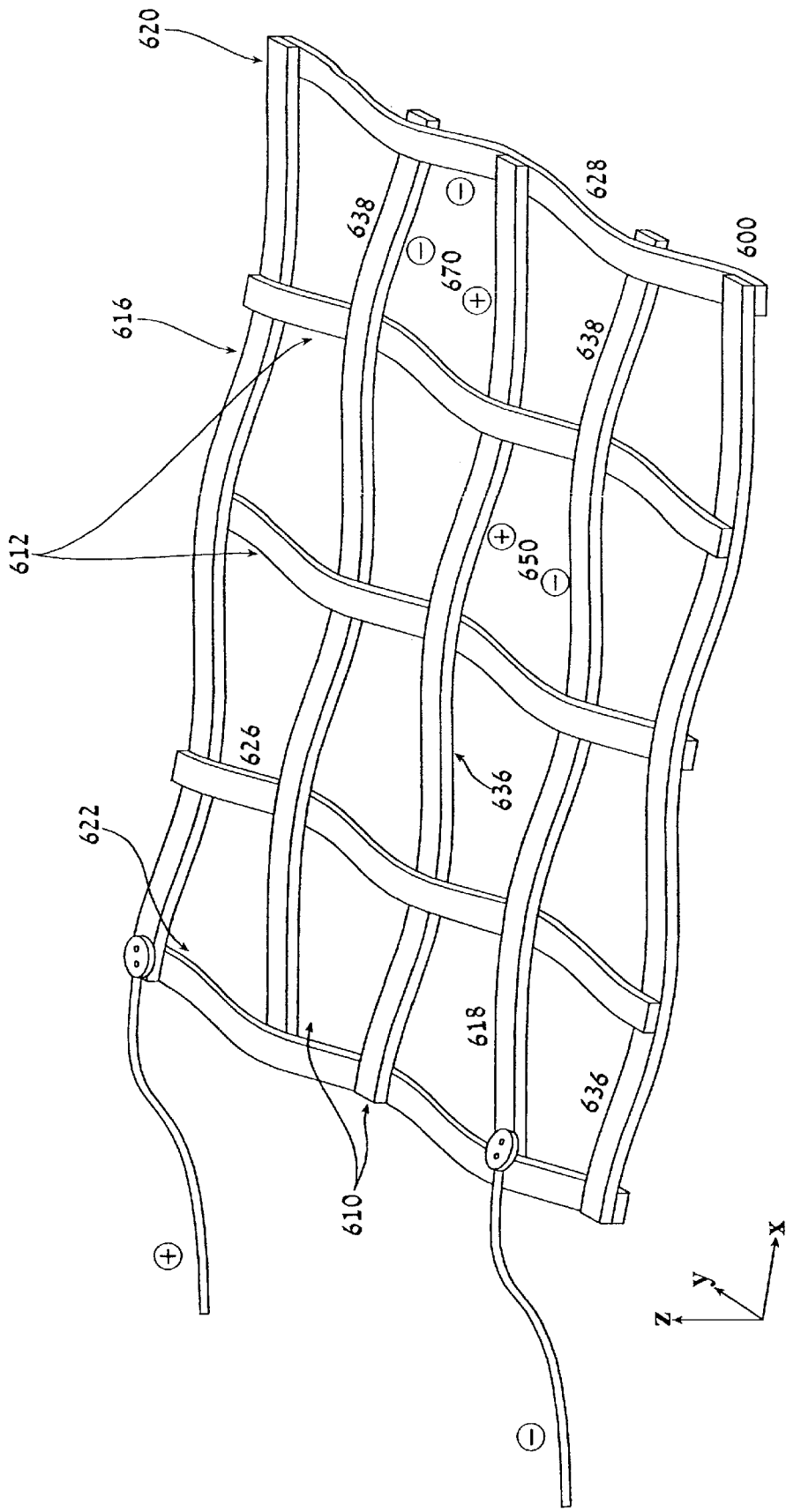
FIG. 5 is a schematic drawing of a presently preferred embodiment of the invention in which the grid is formed from coated and non-coated rectangular strips.

In another preferred embodiment, illustrated by way of example in FIG. 5, the rectangular strips making up the grid 600 are composed primarily of non-conducting materials such as plastics or fiberglass. The construction of the grid is such that all such strips 610 running in the X-direction have a conducting coating 620 on the top side (Z-direction) and the transverse strips 612 running in the Y-direction are non-conducting. Current is propagated to the screen from the power source via two strips, running in the X-direction, one strip 616 carrying a positive charge, the other strip 618, a negative charge (via bare/conducting strip 622).

In the transverse direction, an occasional bare wire or strip is inserted into the weave at odd intervals. The wire or strip can be made of bare conducting metal, or of non-conducting materials with a conducting metal coating.

As a result of the woven configuration, the positively-charged strip 616 transfers current to those occasional conducting strips 626 in the transverse direction with which there is electrical contact, and the negatively-charged strip 618 transfers current to those occasional conducting strips 628 in the transverse direction with which there is electrical contact. Positively-charged strips 626 transfer current to the coated strips 636 running in the X-direction and not connected to the power source, and negatively-charged strips 628 transfer current to the coated strips 638 running in the X-direction and not connected to the power source. Thus, although only two strips are connected to a power source, all conducting strips in the grid become electrically-activated, such that a low-voltage current suitable for repelling insects can be established across the boundaries of the screen openings.

In the configuration of the preferred embodiment described above, all the openings on the grid are surrounded by at least 50% electrically-active contact area. Opening 650, by way of example, is bounded by a positively-charged strip on one side and by a negatively-charged strip on the opposite side. The other two sides are non-conducting. Opening 670 is bounded by a positively-charged strip on one side and by a negatively-charged strip on the opposite side, by a negatively-charged strip on one side and by a non-conducting strip on the opposite side. Thus, the boundaries of opening 670 are at least 75% electrically-active.

Figure 6:
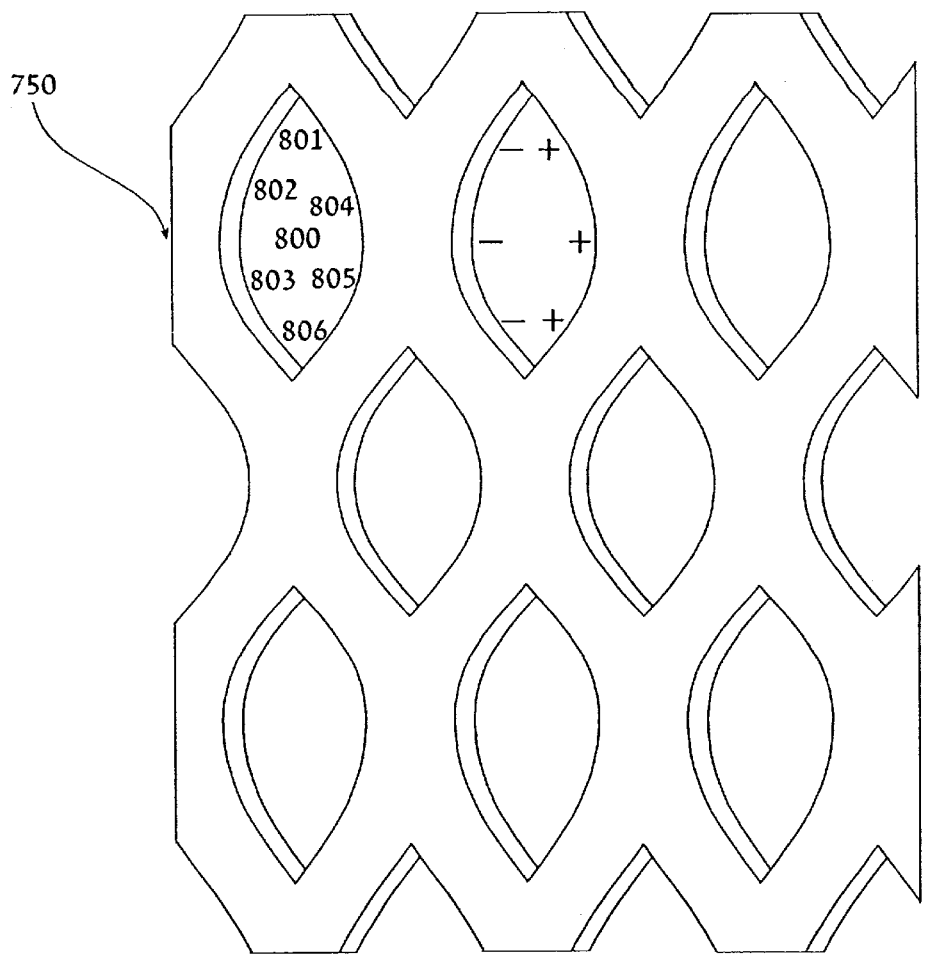
FIG. 6 is a schematic drawing of a presently preferred embodiment of the invention in which the conducting, oppositely-charged layers are separated by a layer of insulation, and wherein slits made in the material are stretched to obtain an expanded, electrically-activated lath.

In the above embodiments, the grid that repels insects is of a woven configuration. In another preferred embodiment, commonly known as expanded mesh, the material is layered in a sandwich-type configuration, with conducting material in the top and bottom layers and an insulating material in between. Slits are made in the material, according to standard industrial practice, such that expanded diamond-shaped mesh is obtained upon stretching (FIG. 6). The top layer of the sandwich material is connected to a positively-charged source; the bottom layer is connected to a negatively-charged source. Upon stretching the lath 750, the expanded diamond-shaped or hexagonal-shaped mesh forms an electrically-activated field. A typical opening 800 has three adjacent negatively-charged sides 801–803 from the bottom layer of the sandwich material, and three adjacent positively-charged sides 804–806 from the top layer of the sandwich material. In this manner, a low-voltage current suitable for repelling insects can be established across the entire (100%) perimeter of the lath openings.

Figure 7:
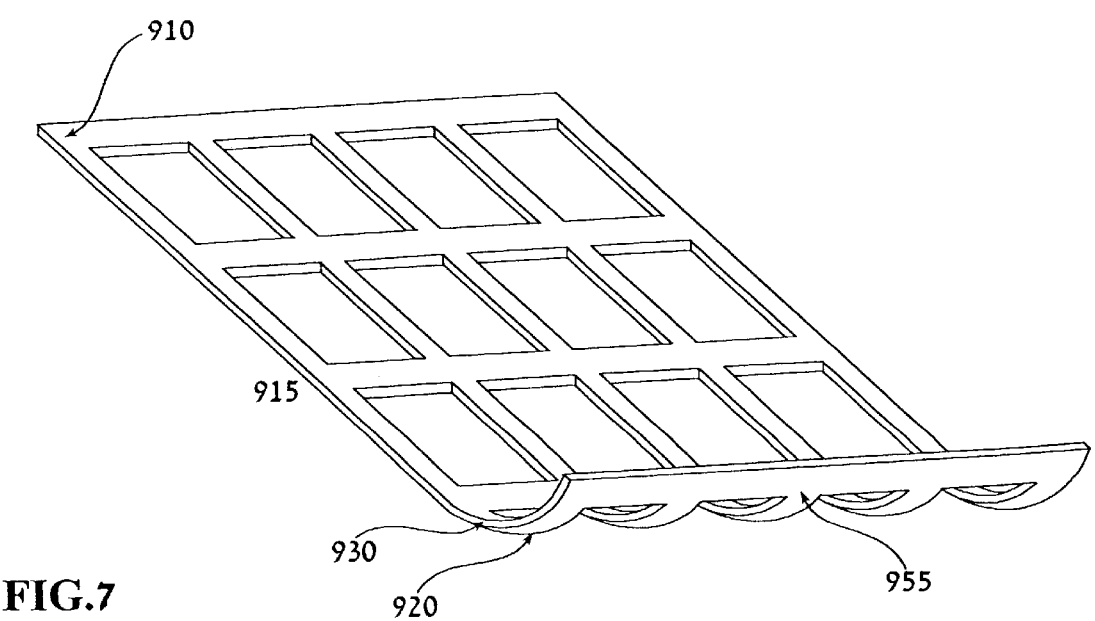
FIG. 7 is a schematic drawing of another presently preferred embodiment of the invention in which the conducting, oppositely-charged layers are separated by a layer of insulation.

In yet another preferred embodiment, the material is layered in a sandwich-type configuration, as described above, with holes or openings of various geometries fashioned through the layers according to standard manufacturing practices. A sandwich-type configuration with square openings 900 is illustrated by way of example in FIG. 7. As described above, the top 910 and bottom 920 layers of the sandwich material are conducting, with an insulating material 930 in between. The top layer of the sandwich material is connected 945 to a positively-charged source; the bottom layer is connected 955 to a negatively-charged source. An insect that attempts to penetrate through an opening 900 must necessarily bridge the gap between the positively-charged layer 910 and the negatively-charged layer 920. The current passing through the body of the insect shocks and repels the insect, thereby inhibiting penetration.

The above-mentioned configurations are sturdy and when connected to a low-voltage, low-current power source, are particularly effective in preventing the intrusion of crawling insects into homes, greenhouses and agricultural storehouses. The present invention can also be used to prevent the intrusion of insects into electronic devices and cabinets, which typically have ventilation holes that provide insects with easy access.

The present invention successfully addresses the shortcomings of the presently known configurations by providing an insect-repelling method and system which are preventive in nature, rather than remedial, in that operation of the system prevents all kinds of insects—including flying insects and including tiny, screen-penetrating insects—from entering the protected structure. The present invention provides a system that is inexpensive, and is simple to manufacture, install and operate. The system also increases the longevity of standard household screens.

While the invention has been described with respect to a limited number of embodiments, it will be appreciated that many variations, modifications and other applications of the invention may be made.

What is claimed is:

1. A system for repelling living creatures, comprising:
    (a) a screen having a plurality of openings, said screen including:
        (i) conducting bare elements running in a first direction, and
        (ii) insulated elements running in a transverse direction, wherein at least two of said insulated elements are conducting insulated elements, and
    (b) a power source operatively connected to at least two of any said conducting elements,
wherein at least two of said conducting insulated elements have bare contact spots for passing current from said conducting insulated elements to said conducting bare elements, and wherein said screen is designed and configured such that a low-voltage differential is produced across boundaries of said opening, such that the living creatures attempting to penetrate said opening are subjected to electrical shock caused by bridging said low-voltage differential.

2. The system according to claim 1, wherein said living creatures are insects.

3. The system according to claim 1, wherein said screen is designed and configured such that all said conducting bare elements in the screen are electrically activated.

4. The system according to claim 3, wherein all of said conducting bare elements in the screen are electrically activated by operative connection of solely two of said conducting insulated elements to said power source.

5. The system according to claim 4, wherein said bare contact spots are produced by melting insulation at said contact spots.

6. The system according to claim 1, wherein said conducting bare elements and said insulated elements are standard household screen type wires.

7. The system according to claim 1, wherein said screen is designed and configured for installation in conventional window openings.

8. The system according to claim 1, wherein said low-voltage differential is less than 200 Volts.

9. A system for repelling living creatures, comprising:
    (a) a screen having a plurality of openings, said screen including:
        (i) a first plurality of conducting elements running in a first direction, each of said conducting elements having a conductive layer along a first side of said elements, and having an insulative layer along a second side of said elements, and
        (ii) a second plurality of conductive elements having at least a second conductive region, said second plurality of conducting elements running in a second direction, such that said first plurality crosses said second plurality, and
    (b) a power source operatively connected to at least two of said conducting elements in said pluralities,
wherein said screen is designed and configures such that a low-voltage differential is produced across boundaries of said openings, such that the living creatures attempting to penetrate said openings are subjected to electrical shock caused by bridging of said low-voltage differential.

10. The system according to claim 9, wherein said conducting elements of said first plurality include rectangular strips.

11. The system according to claim 9, wherein said first plurality and said second plurality are meshed.

12. The system according to claim 9, wherein at least a first of said conducting elements is operatively connected to said power source to obtain a positive charge, and wherein at least a second of said conducting elements is operatively connected to said power source to obtain a negative charge, and wherein said first element transfers current to a first portion of said conducting elements, and said second element transfers current to a second portion of said conducting elements.

13. The system according to claim 9, wherein said boundaries of said openings have substantially 100% electrically-active contact area.

14. A system for repelling living creatures, comprising:
   (a) a sheet having openings passing through said sheet, said sheet including
      (i) a first conductive layer;
      (ii) a second conductive layer, and
      (iii) an insulative medium, said medium disposed in between and connected to said conductive layers;
   (b) a power source operatively connected to said conducting layers, such that said first conductive layer is provided with a charge and said second conductive layer is provided with a second charge, each of said openings being defined by said conductive layers and said insulative medium, wherein said sheet is designed and configured such that a low-voltage differential is produced in a vicinity of each of said openings, such that living creatures attempting to penetrate said openings are subjected to electrical shock caused by bridging of said low-voltage differential.

15. The system according to claim 14, wherein said low-voltage differential is produced across said insulative medium.

16. The system according to claim 14, wherein said openings are bounded by substantially 100% electrically active area.

17. The system according to claim 14, wherein said sheet is designed and configured such that said openings passing through include adjacent sides of differing charge.

18. The system according to claim 14, wherein said openings are bounded by substantially 100% electrically active area.

19. The system according to claim 14, wherein said openings passing through said sheet are slits, and wherein said sheet is designed and configured to form an expanded lath mesh in a stretched disposition.

* * * * *